United States Patent
Rickard, Jr. et al.

(10) Patent No.: US 11,651,237 B2
(45) Date of Patent: *May 16, 2023

(54) PREDICTING AGGREGATE VALUE OF OBJECTS REPRESENTING POTENTIAL TRANSACTIONS BASED ON POTENTIAL TRANSACTIONS EXPECTED TO BE CREATED

(71) Applicant: salesforce.com, inc., San Francisco, CA (US)

(72) Inventors: Scott Thurston Rickard, Jr., Bellevue, WA (US); Elizabeth Rachel Balsam, San Francisco, CA (US); Tracy Morgan Backes, Seattle, WA (US); Zachary Alexander, Snoqualmie, WA (US)

(73) Assignee: Salesforce, Inc., San Francisco, CA (US)

( * ) Notice: Subject to any disclaimer, the term of this patent is extended or adjusted under 35 U.S.C. 154(b) by 996 days.

This patent is subject to a terminal disclaimer.

(21) Appl. No.: 15/721,346

(22) Filed: Sep. 29, 2017

(65) Prior Publication Data
US 2018/0096372 A1 Apr. 5, 2018

Related U.S. Application Data

(60) Provisional application No. 62/402,798, filed on Sep. 30, 2016.

(51) Int. Cl.
*G06Q 30/02* (2012.01)
*G06N 20/10* (2019.01)
(Continued)

(52) U.S. Cl.
CPC ............ *G06N 5/022* (2013.01); *G06N 5/003* (2013.01); *G06N 20/00* (2019.01); *G06N 20/20* (2019.01);
(Continued)

(58) Field of Classification Search
CPC ...................................................... G06Q 30/02
(Continued)

(56) References Cited

U.S. PATENT DOCUMENTS 6,430,539 B1 * 8/2002 Lazarus ................ G06Q 30/02
705/14.1
8,762,379 B2 6/2014 Birdwell et al.
(Continued)

OTHER PUBLICATIONS

Rupal Rana, Fernando S. Oliveira, Dynamic pricing policies for interdependent perishable products or services using reinforcement learning; Expert Systems with Applications 42 (2015) 426-436; Retrieved from: https://patents.google.com/, (Year: 2015).*
(Continued)

*Primary Examiner* — Gautam Ubale
(74) *Attorney, Agent, or Firm* — Fenwick & West LLP

(57) ABSTRACT

An online system stores objects representing potential transactions of an enterprise. The online system uses predictor models to determine an aggregate score based on values of the objects associated with a time interval, for example, a month. Each object is configured to take one of a plurality of states. The online system stores historical data describing activities associated with potential transaction objects and uses the stored data for generating the predictor models. The online system categorizes the objects into bins based on states of the objects. The online system may generate different predictions for each category. The online system may use machine learning based models as predictor models. The online system extracts features describing potential transaction objects and provides these as input to the predictor model.

10 Claims, 12 Drawing Sheets

(51) Int. Cl.
*G06N 5/022* (2023.01)
*G06N 20/00* (2019.01)
*G06N 5/00* (2023.01)
*G06N 20/20* (2019.01)
*G06Q 30/0201* (2023.01)
*G06Q 30/0203* (2023.01)
*G06Q 30/0204* (2023.01)
*G06N 3/08* (2023.01)
*G06N 7/00* (2023.01)

(52) U.S. Cl.
CPC ..... *G06Q 30/0201* (2013.01); *G06Q 30/0203* (2013.01); *G06Q 30/0204* (2013.01); *G06N 3/08* (2013.01); *G06N 7/005* (2013.01); *G06N 20/10* (2019.01)

(58) Field of Classification Search
USPC .......................................... 705/7.13, 14, 319
See application file for complete search history.

(56) References Cited

U.S. PATENT DOCUMENTS

| | | | |
|---|---|---|---|
| 10,410,155 B2 | 9/2019 | Das et al. | |
| 2002/0165755 A1* | 11/2002 | Kitts | G06Q 30/02 705/7.29 |
| 2005/0189414 A1* | 9/2005 | Fano | G06Q 30/02 705/14.27 |
| 2008/0077487 A1* | 3/2008 | Davis | G06Q 30/02 705/14.25 |
| 2008/0162487 A1* | 7/2008 | Richter | G06Q 10/00 |
| 2010/0049538 A1* | 2/2010 | Frazer | G06Q 30/0244 705/14.43 |
| 2011/0004509 A1* | 1/2011 | Wu | G06Q 30/0631 705/26.7 |
| 2012/0143861 A1* | 6/2012 | Sethi | G06Q 10/087 707/E17.014 |
| 2012/0278091 A1 | 11/2012 | Yaseen et al. | |
| 2012/0303411 A1 | 11/2012 | Chen et al. | |
| 2013/0173419 A1 | 7/2013 | Farber et al. | |
| 2013/0204663 A1* | 8/2013 | Kahlow | H04L 67/535 705/7.31 |
| 2014/0108094 A1 | 4/2014 | Beddo et al. | |
| 2015/0073929 A1 | 3/2015 | Psota et al. | |
| 2015/0088644 A1* | 3/2015 | Shay | G06Q 30/0254 705/14.52 |
| 2015/0112756 A1 | 4/2015 | Subramanian et al. | |
| 2015/0134413 A1* | 5/2015 | Deshpande | G06Q 30/0205 705/7.31 |
| 2016/0171540 A1* | 6/2016 | Mangipudi | G06Q 30/0255 705/14.53 |
| 2016/0307210 A1* | 10/2016 | Agarwal | G06Q 10/06316 |
| 2018/0150783 A1* | 5/2018 | Xu | G06Q 10/0633 |
| 2022/0067864 A1* | 3/2022 | Walsh | G06F 21/6245 |

OTHER PUBLICATIONS

Sebastien Thomassey, Sales forecasts in clothing industry: The key success factor of the supply chain management, Int. J. Production Economics 128 (2010 470-483; Retrieved from: https://patents.google.com/, (Year: 2010).*

Toward a new classification model for analysing financial datasets (Year: 2012).*

Transaction Processing Past Present and Future (Year: 2012).*

Inter Time Series Sales Forecasting (Year: 2013).*

United States Office Action, U.S. Appl. No. 15/721,336, filed Dec. 2, 2020, 50 pages.

United States Office Action, U.S. Appl. No. 15/721,336, filed Dec. 20, 2021, 22 pages.

Gahirwal, M. et al. "Inter Time Series Sales Forecasting." arXiv Preprint arXiv: 1303.0117, Mar. 1, 2013, pp. 1-11.

United States Office Action, U.S. Appl. No. 15/721,336, filed Aug. 10, 2022, 22 pages.

* cited by examiner

FIG. 4

| Month | Date | Omitted | Pipeline | Best Case | Commit | Closed | Business Days Left | Actual Close |
|---|---|---|---|---|---|---|---|---|
| 5 | 2015-05-01 | 2,932,869.00 | 9,314,626.00 | 3,915,216.00 | 486,545.00 | 292,782.00 | 20 | 11614760 |
| 5 | 2015-05-04 | 2,911,380.00 | 9,051,695.00 | 3,734,614.00 | 500,573.00 | 507,757.00 | 19 | 11614760 |
| 5 | 2015-05-05 | 1,819,365.00 | 9,000,771.00 | 3,866,412.00 | 440,920.00 | 907,508.00 | 18 | 11614760 |
| 5 | 2015-05-06 | 1,551,683.00 | 8,822,988.00 | 3,745,277.00 | 425,103.00 | 1,411,289.00 | 17 | 11614760 |
| 5 | 2015-05-07 | 1,272,418.00 | 8,488,874.00 | 3,612,752.00 | 576,624.00 | 1,746,464.00 | 16 | 11614760 |
| 5 | 2015-05-08 | 1,058,749.00 | 7,845,480.00 | 3,708,043.00 | 588,829.00 | 2,056,267.00 | 15 | 11614760 |
| 5 | 2015-05-11 | 862,195.00 | 7,195,114.00 | 3,635,506.00 | 739,871.00 | 2,606,370.00 | 14 | 11614760 |
| 5 | 2015-05-12 | 601,998.00 | 6,911,463.00 | 3,648,378.00 | 706,941.00 | 3,061,497.00 | 13 | 11614760 |
| 5 | 2015-05-13 | 489,092.00 | 6,263,417.00 | 3,620,308.00 | 807,114.00 | 3,287,817.00 | 12 | 11614760 |
| 5 | 2015-05-14 | 447,968.00 | 5,913,946.00 | 3,672,695.00 | 811,907.00 | 3,617,818.00 | 11 | 11614760 |
| 5 | 2015-05-15 | 400,221.00 | 5,702,387.00 | 3,695,468.00 | 743,667.00 | 4,105,799.00 | 10 | 11614760 |
| 5 | 2015-05-18 | 391,311.00 | 5,155,233.00 | 3,797,405.00 | 716,042.00 | 4,625,817.00 | 9 | 11614760 |
| 5 | 2015-05-19 | 296,070.00 | 4,641,564.00 | 3,731,235.00 | 634,816.00 | 5,111,398.00 | 8 | 11614760 |
| 5 | 2015-05-20 | 238,121.00 | 3,813,784.00 | 3,638,640.00 | 905,549.00 | 5,505,630.00 | 7 | 11614760 |
| 5 | 2015-05-21 | 151,178.00 | 3,288,228.00 | 3,562,892.00 | 949,689.00 | 5,936,987.00 | 6 | 11614760 |
| 5 | 2015-05-22 | 124,593.00 | 2,625,310.00 | 3,362,378.00 | 941,321.00 | 6,442,205.00 | 5 | 11614760 |
| 5 | 2015-05-25 | 61,232.00 | 1,904,871.00 | 3,403,383.00 | 928,773.00 | 6,918,628.00 | 4 | 11614760 |
| 5 | 2015-05-26 | 61,234.00 | 1,800,063.00 | 3,245,400.00 | 970,454.00 | 7,032,050.00 | 4 | 11614760 |
| 5 | 2015-05-27 | 29,430.00 | 1,149,418.00 | 2,922,233.00 | 1,241,560.00 | 7,628,725.00 | 3 | 11614760 |
| 5 | 2015-05-28 | 19,122.00 | 751,620.00 | 2,335,031.00 | 1,337,966.00 | 8,242,641.00 | 2 | 11614760 |

FIG. 7

| Month | Date | Omitted | Pipeline | Best Case | Commit | Closed | PipelineBestCase | CommitClosed | Business Days Left | Actual Close |
|---|---|---|---|---|---|---|---|---|---|---|
| 5 | 2015-05-01 | 2,832,869.00 | 9,314,628.00 | 3,915,216.00 | 486,545.00 | 292,782.00 | 13,229,844.00 | 779,327.00 | 20 | 11614760 |
| 5 | 2015-05-04 | 2,911,380.00 | 9,051,695.00 | 3,734,614.00 | 500,573.00 | 507,757.00 | 12,786,309.00 | 1,008,330.00 | 19 | 11614760 |
| 5 | 2015-05-05 | 1,818,305.00 | 9,000,771.00 | 3,866,412.00 | 440,926.00 | 937,506.00 | 12,867,183.00 | 1,378,428.00 | 18 | 11614760 |
| 5 | 2015-05-06 | 1,551,663.00 | 8,822,968.00 | 3,745,277.00 | 425,103.00 | 1,411,289.00 | 12,568,245.00 | 1,836,392.00 | 17 | 11614760 |
| 5 | 2015-05-07 | 1,272,418.00 | 8,488,874.00 | 3,612,752.00 | 576,624.00 | 1,746,464.00 | 12,101,626.00 | 2,323,088.00 | 16 | 11614760 |
| 5 | 2015-05-08 | 1,058,749.00 | 7,645,480.00 | 3,705,043.00 | 588,809.00 | 2,056,287.00 | 11,350,523.00 | 2,645,096.00 | 15 | 11614760 |
| 5 | 2015-05-11 | 882,195.00 | 7,195,114.00 | 3,835,506.00 | 739,871.00 | 2,606,370.00 | 11,030,620.00 | 3,346,241.00 | 14 | 11614760 |
| 5 | 2015-05-12 | 601,998.00 | 6,911,463.00 | 3,848,378.00 | 706,941.00 | 3,051,497.00 | 10,559,841.00 | 3,758,438.00 | 13 | 11614760 |
| 5 | 2015-05-13 | 489,092.00 | 6,263,417.00 | 3,620,308.00 | 607,114.00 | 3,367,817.00 | 9,883,725.00 | 4,074,931.00 | 12 | 11614760 |
| 5 | 2015-05-14 | 447,958.00 | 5,913,946.00 | 3,672,695.00 | 811,907.00 | 3,617,818.00 | 9,586,641.00 | 4,429,725.00 | 11 | 11614760 |
| 5 | 2015-05-15 | 400,221.00 | 5,702,387.00 | 3,695,468.00 | 743,667.00 | 4,105,799.00 | 9,397,855.00 | 4,849,466.00 | 10 | 11614760 |
| 5 | 2015-05-18 | 391,311.00 | 6,155,233.00 | 3,797,405.00 | 716,042.00 | 4,625,817.00 | 8,962,638.00 | 5,341,859.00 | 9 | 11614760 |
| 5 | 2015-05-19 | 295,070.00 | 4,641,564.00 | 3,731,235.00 | 834,816.00 | 5,111,398.00 | 8,372,799.00 | 5,946,214.00 | 8 | 11614760 |
| 5 | 2015-05-20 | 235,121.00 | 3,813,754.00 | 3,638,640.00 | 905,549.00 | 5,505,630.00 | 7,452,394.00 | 6,411,179.00 | 7 | 11614760 |
| 5 | 2015-05-21 | 151,176.00 | 3,288,236.00 | 3,562,893.00 | 949,689.00 | 5,906,987.00 | 6,851,130.00 | 6,856,676.00 | 6 | 11614760 |
| 5 | 2015-05-22 | 134,580.00 | 2,625,310.00 | 3,462,378.00 | 941,321.00 | 6,442,205.00 | 5,987,688.00 | 7,383,526.00 | 5 | 11614760 |
| 5 | 2015-05-25 | 81,232.00 | 1,904,871.00 | 3,403,383.00 | 928,773.00 | 6,918,628.00 | 5,308,254.00 | 7,847,401.00 | 4 | 11614760 |
| 5 | 2015-05-26 | 61,234.00 | 1,800,063.00 | 3,245,400.00 | 970,464.00 | 7,032,050.00 | 5,045,463.00 | 8,002,504.00 | 4 | 11614760 |
| 5 | 2015-05-27 | 29,430.00 | 1,149,418.00 | 2,922,233.00 | 1,241,560.00 | 7,626,725.00 | 4,071,651.00 | 8,868,285.00 | 3 | 11614760 |
| 5 | 2015-05-28 | 18,122.00 | 751,620.00 | 2,335,031.00 | 1,337,966.00 | 8,242,641.00 | 3,086,651.00 | 9,580,607.00 | 2 | 11614760 |

PREDICTING AGGREGATE VALUE OF OBJECTS REPRESENTING POTENTIAL TRANSACTIONS BASED ON POTENTIAL TRANSACTIONS EXPECTED TO BE CREATED

CROSS REFERENCE TO RELATED APPLICATIONS

This application claims the benefits of U.S. Provisional Application No. 62/402,798 filed on Sep. 30, 2016, which is incorporated by reference in its entirety.

BACKGROUND

Field of Art

The disclosure relates to predicting an aggregate score representing a state of a system in general and more specifically to predicting an aggregate score for a system comprising objects based on models such as machine learning based predictor models.

Description of The Related Art

Online systems used by enterprises store large amount of data describing entities associated with the enterprise such as user accounts, documents, transactions, and so on. Examples of such online systems include multi-tenant systems that are configured to store data of multiple enterprises. These online systems provide tools for users associated with enterprises configured to allow the users to store and manage information processed by the enterprises, for example, for managing user interactions or transactions of the enterprise. Online systems often need to determine how a system, for example, a system representing objects of an enterprise would perform during a time interval. Conventional tools often provide the information very late or after the time interval is over thereby precluding a corrective actions for improving the performance that may be taken during the time interval. Therefore, conventional tools supported by such online systems are often inadequate in terms of providing valuable analysis indicating an overall performance of the system, for example, indicating how the system is performing.

BRIEF DESCRIPTION OF DRAWINGS

The disclosed embodiments have advantages and features which will be apparent from the detailed description, the appended claims, and the accompanying figures (or drawings). A brief introduction of the figures is below.

FIG. 4 shows an example of historical data associated with a potential transaction object stored in the online system, in accordance with an embodiment.

FIG. 7 illustrates the preparation of the historical data for generating models, according to an embodiment.

FIG. 9 illustrates object data showing two supplementary columns added based on PCA, according to an embodiment of the invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

An online system stores data of one or more enterprises and provides tools that provide valuable information to users of the enterprise. These tools provide analysis of objects representing entities associated with an enterprise, for example, objects storing information associated with potential transactions of the enterprise. For example, a user associated with the enterprise may interact with a third party in anticipation that the third party would perform a transaction that benefits the enterprise. Each object can take one of a plurality of states. The state of an object may change when certain data associated with the object changes, for example, when certain user interaction associated with the object is performed. The online system uses machine learning techniques to predict a total value of the potential transactions that complete successfully within a given time interval, for example, by the end of the current month. The online system provides data describing the predicted total value to the users. In an embodiment, the online system provides recommendations to users based on the total value, for example, recommendations of potential transactions for users of the enterprise to focus on, to maximize the value to the enterprise.

Figure 1:
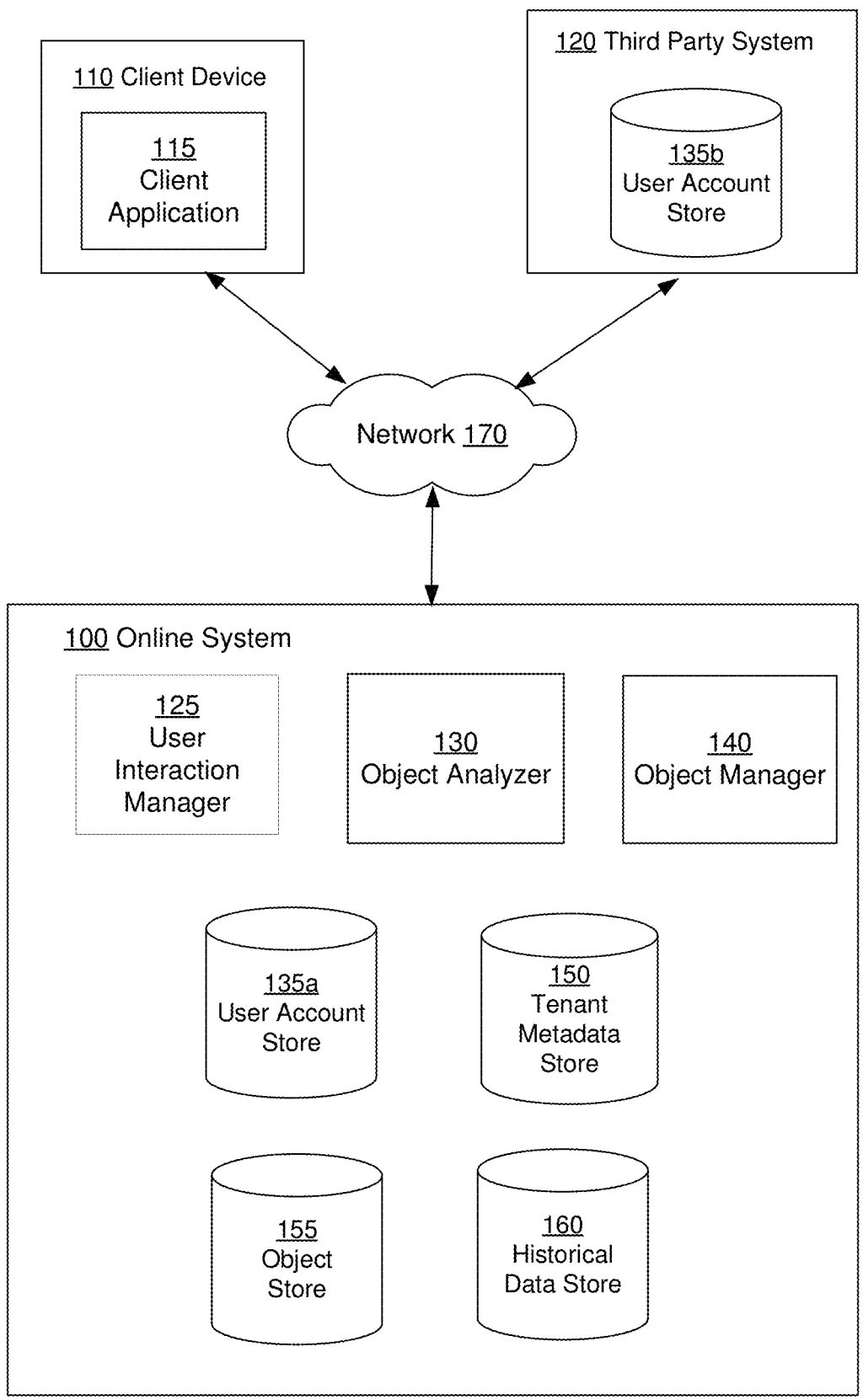
FIG. 1 shows an overall system environment illustrating an online system for storing and analyzing objects associated with potential transactions, in accordance with an embodiment.

FIG. 1 shows an overall system environment illustrating an online system for storing and analyzing objects associated with potential transactions, in accordance with an embodiment. The overall system environment includes an online system 100, one or more client devices 110, a third party system 120, and a network 170. Other embodiments may use more or less or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "135a," indicates that the text refers specifically to the element having that particular reference numeral. A reference numeral in the text without a following letter, such as "135," refers to any or all of the elements in the figures bearing that reference numeral (e.g. "135" in the text refers to reference numerals "135a" and/or "135b" in the figures).

A client device 110 is used by users to interact with the online system 100. A user interacts with the online system 100 using client application 115. An example of a client application 115 is a browser application. In an embodiment, the client application 115 interacts with the online system 100 using requests sent over network 170. The client device 110 presents user interfaces configured by the online system 100 via the client application 115.

A third party system 120 is associated with a third party that may be an enterprise. The third party may be a potential customer of an enterprise associated with an online system 100. The third party system 120 includes a user account store 135b that stores information describing users of the third party system 120. The third party system 120 may include other components not shown in FIG. 1.

An enterprise E1 may store information describing activities of the enterprise E1 on the online system 100. In an example scenario, a user U1 of enterprise E1 identifies an enterprise E2 (a third party) as a potential customer for a product or service offered by enterprise E1. Accordingly, the user U1 of the enterprise E1 identifies a potential transaction between enterprise E1 and enterprise E2 related to the product or service offered by enterprise E1. The potential transaction may be a sale of the product or service or an agreement that results in enterprise E2 using the product or service of enterprise E1 in exchange for certain remuneration, for example, a monetary payment. The potential transaction is also referred to herein as an opportunity.

The user U1 interacts with users of enterprise E2 to ensure that the potential transaction or the opportunity is converted to an actual transaction that is successfully executed. In this situation, the potential transaction or opportunity is considered successful or is closed as a success. Alternatively, the user U1 may determine that the likelihood of having a successful transaction with enterprise E2 is below a threshold and accordingly determine that the opportunity is closed as a failure.

The interactions between user U1 and users associated with the enterprise E2 may include online interactions with the third party system 120, for example, via email, messenger, video conference, and so on. Other interactions between user U1 and users associated with the enterprise E2 may be performed outside the third party system 120 and/or the online system 100. For example, the user U1 and users associated with the enterprise E2 may interact via phone, mail, or in person. However, information describing these interactions is provided to the online system 100 and stored by the online system 100 in connection with the potential transaction associated with enterprise E2.

The online system 100 stores information associated with one or more enterprises. The information stored in connection with an enterprise in the online system 100 includes objects representing various entities associated with the enterprise, for example, user accounts representing users, objects representing potential transactions, and so on. The information stored in connection with an enterprise in the online system 100 includes historical data representing various interactions associated with enterprises, for example, user interactions associated with a potential transaction.

The online system 100 represents potential transactions or opportunities as potential transaction objects. A potential transaction object may also be referred to herein as an opportunity object. The online system 100 uses historical data describing state changes of potential transaction objects to predict whether a new potential transaction would close as a success or a failure. Accordingly, the online system 100 predicts whether the new potential transaction would result in a transaction or fail to result in a transaction. The online system 100 may generate statistical aggregate information based on the predicted information. For example, the online system 100 may generate aggregate sales predictions for a given time period, for example, an expected revenue based on sales that are predicted to close successfully by the month end. The online system 100 compares various combinations of potential transactions that can be acted upon within a time interval and makes recommendations as to which potential transactions should be actively pursued by the associated users of the online system 100 to maximize the expected revenue.

The online system 100 includes a user interaction manager 125, an object manager 140, an object analyzer 130, a user account store 135, a tenant metadata store 150, an object store 155, and an historical data store 160. Other embodiments may include more or fewer modules than those indicated herein. Functions indicated herein as being performed by a module may be performed by other modules than those indicated herein.

The user interaction manager 125 configures user interfaces for presenting to users via client devices 110. The user interaction manager 125 receives user interactions from client devices 110. In an embodiment, the user interaction manager 125 configures a user interface that allows users to provide information describing user interactions that are performed outside the online system 100. For example, if a first user of the online system 100 interacts with a second user of the third party system 120 via phone, the first user may provide information describing the call via a user interface to the user interaction manager 125.

The object store 155 stores objects representing entities associated with an enterprise. An enterprise may be an organization, a business, a company, a club, or a social group. An object may represent an account representing a business partner or potential business partner (e.g. a client, vendor, distributor, etc.) of a user, and may include attributes describing a company, subsidiaries, or contacts at the company. As another example, an object may represent a project that a user is working on with an existing partner, or a project that the user is trying to get. An object may represent an account representing a user or another entity associated with the enterprise. For example, an account may represent a customer of the first enterprise. An object may represent a user of the online system.

In an embodiment, the object store 155 stores an object as one or more records in a database. An object has data fields that are defined by the structure of the object (e.g. fields of certain data types and purposes). For example, an object representing an entity may store information describing the potential customer, a status of the opportunity indicating a stage of interaction with the customer, and so on.

The object store 155 may be implemented as a relational database storing one or more tables. Each table contains one or more data categories logically arranged as columns or fields. Each row or record of a table contains an instance of data for each category defined by the fields. For example, an object store 155 may include a table that describes a customer with fields for basic contact information such as name, address, phone number, fax number, etc. Another table might describe a purchase order, including fields for information such as customer, product, sale price, date, etc.

An object may include links or references to other objects. For example an opportunity object may include links to contact objects and account objects, an account object may include links to contact objects and so on. An object may have outgoing links that allow the object to refer to other objects as well as incoming links that allow other objects to refer to the object.

An object may represent a potential transaction, also referred to herein as an opportunity. For example, a user associated with a first enterprise may identify a third party, for example, another enterprise as a potential customer of a product or service offered by the first enterprise. The online system 100 creates a potential transaction object representing the engagement with the third party. In an embodiment, the user of the first enterprise provides information describing the potential transaction to the online system. The online system 100 stores the information describing the potential transaction or the opportunity as a potential transaction object.

A potential transaction object is associated with a potential transaction type depending on the type of engagement anticipated between the enterprise and the third party. Examples of potential transaction types include, a new engagement (for example, the first engagement between the enterprise and a third party), an add-on to an existing engagement (for example, an engagement anticipating that a third party previously engaged in a transaction with the enterprise would add a new product or service offered by the enterprise to the existing engagement), a renewal of an existing engagement, and so on.

The potential transaction object includes various attributes, for example, information identifying the third party, information identifying an item offered by the first enterprise that is a subject of the potential transaction, for example, a product or service offered by the first enterprise, an amount representing a value of the potential transaction, a date of creation of the potential transaction object or the date of initiation of the interaction between the first enterprise and the third party in connection with the potential transaction, an identifier of the user creating the potential transaction object, an identifier of the potential transaction object, an expected closing date for the potential transaction, and so on.

A potential transaction object is associated with a state that represents a stage of the potential transaction. A potential transaction object is associated with a current state that may change based on user interactions associated with the object. For example, a newly created potential transaction object is initialized to an "initial" state. If the third party decides to purchase the product or service offered by the first enterprise, the state of the potential transaction object is updated to a "closed won" state. Similarly if the third party confirms that the third party would not purchase the product or service offered by the first enterprise, the state of the potential transaction object is updated to a "closed lost" state or a "omitted" state. A potential transaction object is also associated with a category such that each category maps to one or more stages that each potential transaction object can have. In an embodiment, the various stages and categories are defined by each enterprise based on the process used by the enterprise.

In an embodiment, the online system 100 receives the names of various stages from a user, for example, an administrator associated with an enterprise. Examples of stages associated with a potential transaction include "pipeline", "closed", "omitted", "committed", and so on. For example, a potential transaction object that is newly created is initialized to a "pipeline" stage, a potential transaction object is moved to a "best case" stage responsive to some promising interactions with the third party, the potential transaction object is in a "commit" stage if the potential transaction is undergoing negotiations of contract details, the potential transaction object is in a "closed won" stage if an actual transaction is executed responsive to a sale, the potential transaction object is in an "omitted" stage (or a "closed lost" stage) if the potential transaction fails and the sales opportunity is lost. The online system associates each stage of the potential transaction with a state of the potential transaction object. The online system 100 receives the specification of each stage describing the user interactions associated with a potential transaction object that cause the potential transaction object to have a particular stage and the user interactions that cause the potential transaction object to change from one stage to another stage. In an embodiment, potential objects of different type have different pipelines of stages.

The historical data store 160 stores historical information associated with various objects. The historical information is stored as records, each record storing an object identifier for identifying the object associated with the activity, for example, an identifier for a potential transaction object. The various attributes stored in each record of historical data store comprise, an identifier used for identifying the object, an identifier for the opportunity associated with the object, an identifier for the user that made the change associated with the record, a created date represented as a timestamp of when the change associated with the record occurred, a timestamp representing an expected time for the potential transaction to close, a high level category that describes the state of the object, for example, the state of the potential transaction in the process, a probability indicating a likelihood of success of the sale, an estimated amount indicating the value of the potential transaction, and the currency of the potential transaction. In one embodiment, each stage has a specific probability associated with it and a user can overwrite the value. In another embodiment, the probability is determined by the system using a machined learned model that is trained using historical opportunity data. The category of the potential transaction may take a value from one of the following: pipeline: initial discussions have started for the potential transaction; best case: after initial discussions have been held; forecast (may also be referred to as commit): a user indicates that the potential transaction will close successfully; closed: potential transaction was successfully closed; omitted: acts as a placeholder, such as if user wants to remind himself to call a third party to initialize a potential transaction.

In an embodiment, the object manager 140 is configured to detect changes in attributes belonging to a set of attributes associated with objects. If the object manager 140 detects a change in value in any attribute from the set of attributes, the object manager stores a record describing the attributes of the object in the historical data store 160. For example, for a potential transaction object, the object manager 140 stores a record in the historical data store 160 if there is a change in value of any attribute including the state of the potential transaction object, an amount of the object, a predicted likelihood of success of the potential transaction, and so on. In an embodiment, the online system 100 uses the object identifier to associate various attributes describing the object with the record of the historical data store 160.

Accordingly, the historical data store 160 stores activities associated with an object comprising, creation of the object, any state changes associated with the object, any user interactions associated with the object, any change in an amount associated with a potential transaction object, a change in the probability of a potential transaction object reaching a "closed won" state or a "closed lost" state (if the change in the probability is more than a threshold value), a change in a predicted state that a potential transaction object is expected to close, and so on.

The object analyzer 130 uses the records stored in the historical data store 160 as training data set for a machine learning model used for predicting information about the object, for example, for determining a probability of the object reaching a "closed won" state. The object state analyzer predicts a close date for a potential transaction object. The close date corresponds to a date that the potential transaction object is expected to reach a closed state, for example, a "closed won" state. Accordingly, the close date represents the date when an actual transaction corresponding to the potential transaction is executed, for example, responsive to a sale performed by the enterprise to a third party. The object analyzer 130 is described in detail in connection with FIG. 2.

The object manager 140 manages the stages of various potential transaction objects. The object manager 140 may receive input via the client application 115 indicating that the potential transaction has reached a particular stage. The object manager 140 modifies the state of the potential transaction object based on the received input. In an embodiment, the object manager 140 monitors user interactions performed by the user associated with the potential transaction object and modifies the state based on the monitored interactions.

In some embodiments, an online system 100 is a multi-tenant system. The online system 100 stores metadata describing the tenants in tenant metadata store 150. Each tenant may be an enterprise as described herein. As an example, one tenant might be a company that employs a sales force where each salesperson uses a client device 110 to manage their sales process. Thus, a user might maintain contact data, leads data, customer follow-up data, performance data, goals and progress data, etc., all applicable to that user's personal sales process.

In one embodiment, online system 100 implements a web-based customer relationship management (CRM) system. For example, in one embodiment, the online system 100 includes application servers configured to implement and execute CRM software applications as well as provide related data, code, forms, webpages and other information to and from client devices 110 and to store to, and retrieve from, a database system related data, objects, and webpage content.

With a multi-tenant system, data for multiple tenants may be stored in the same physical database, however, tenant data typically is arranged so that data of one tenant is kept logically separate from that of other tenants so that one tenant does not have access to another tenant's data, unless such data is expressly shared. The tenant metadata store 150 stores information that allows identification of data for different tenants, for example, using identifiers that uniquely identify each tenant. The tenant metadata store 150 stores various stages of potential transaction objects defined by an enterprise.

In certain embodiments, the online system 100 implements applications other than, or in addition to, a CRM application. For example, the online system 100 may provide tenant access to multiple hosted (standard and custom) applications, including a CRM application. According to one embodiment, the online system 100 is configured to provide webpages, forms, applications, data and media content to client devices 110 to support the access by client devices 110 as tenants of online system 100. As such, online system 100 provides security mechanisms to keep each tenant's data separate unless the data is shared.

A multi-tenant system may implement security protocols that keep data, applications, and application use separate for different tenants. In addition to user-specific data and tenant-specific data, the online system 100 may maintain system level data usable by multiple tenants or other data. Such system level data may include industry reports, news, postings, and the like that are sharable among tenants.

It is transparent to customers that their data may be stored in a table that is shared with data of other customers. A database table may store rows for a plurality of customers. Accordingly, in a multi-tenant system various elements of hardware and software of the system may be shared by one or more customers. For example, the online system 100 may execute an application server that simultaneously processes requests for a number of customers.

The online system 100 and client devices 110 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The online system 100 stores the software modules storing instructions for embodiments, for example object analyzer 130.

The interactions between the client devices 110 and the online system 100 are typically performed via a network 170, for example, via the Internet. In one embodiment, the network uses standard communications technologies and/or protocols. In another embodiment, the entities can use custom and/or dedicated data communications technologies instead of, or in addition to, the ones described above. The techniques disclosed herein can be used with any type of communication technology, so long as the communication technology supports receiving by the online system 100 of web requests from a sender, for example, a client device 110 and transmitting of results obtained by processing the web request to the sender.

System Architecture

Figure 2:
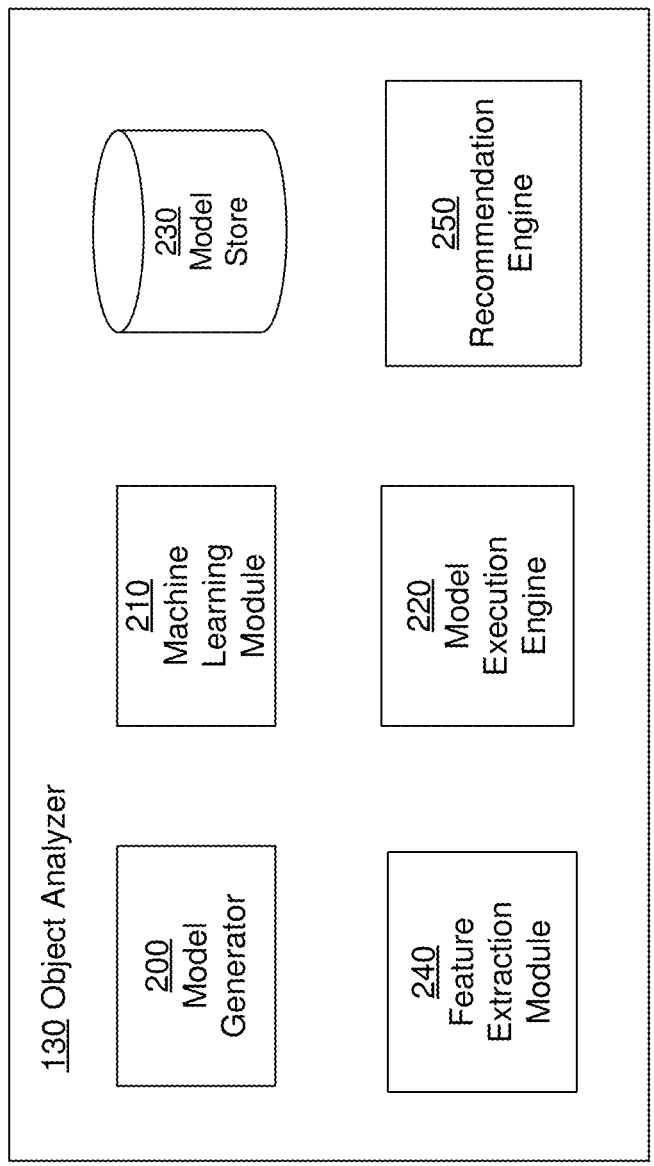
FIG. 2 shows the system architecture of an object analyzer for analyzing potential transaction objects, in accordance with an embodiment.

FIG. 2 shows the system architecture of an object analyzer 130 for analyzing potential transaction objects, in accordance with an embodiment. The object analyzer 130 comprises a model generator 200, a machine learning module 210, a feature extraction module 240, a recommendation engine 250, a model execution engine 220, and a model store 230. Other embodiments may include more or fewer modules. Functionality indicated herein as being performed by a particular module may be performed by other modules.

The model generator 200 generates various predictor models for predicting scores used for determining the total value of potential transactions that are considered successful at the end of a given time interval, for example, a month. In an embodiment, the model generator 200 receives parameters associated with predictor model from an expert. In other embodiments, the model generator 200 determines parameters associated with predictor models based on numerical techniques. For example, parameters associated with a model may be determined using curve fitting techniques. In an embodiment, the model generator 200 invokes the machine learning module 210 to generate machine learning based models obtained by training the models based on historical data.

The machine learning module 210 trains predictor models by extracting features describing potential transaction objects that were previously processed and creating a feature vector. The machine learning module 210 stores the predictor models in the predictor model store 230. The model execution engine 220 loads a predictor model and executes the predictor model. In an embodiment, the machine learning module 210 uses dimensionality reduction (e.g., via linear discriminant analysis, principle component analysis, etc.) to reduce the amount of data in the feature vector to a smaller, more representative core set of features.

The training set for the predictor models includes positive and negative examples comprising potential transaction objects that resulted in actual transactions and those that failed to result in actual transactions. Machine learning algorithms used include support vector machines (SVMs), boosting for other algorithms (e.g., AdaBoost), neural net, logistic regression, naïve Bayes, memory-based learning, random forests, bagged trees, decision trees, boosted trees, boosted stumps, etc.

The feature extraction module 240 extract features of potential transaction objects for use by machine learning module 210 or the predictor models. The feature extraction module 240 extract features of potential transaction objects for use in training models by the machine learning module 210. The feature extraction module 240 also extract features of potential transaction objects for predicting information describing potential transaction objects, for example, for predicting a likelihood of a potential transaction object resulting in a successful transaction. In an embodiment, the feature extraction module 240 represents a feature using a name and a value.

Examples of features extracted by the feature extraction module 240 include the following: a rate of user interactions associated with the potential transaction object within a past time interval; a rate of updates to the potential transaction object; total number of updates to the potential transaction object since the potential transaction object was created; the age of the potential transaction object, i.e., the number of days since the potential transaction object was created; the number of days since last update to the potential transaction object; number of category changes since creation of the potential transaction object; a current category of the potential transaction object; number of days since the potential transaction object entered the current category; number of changes to the category since the potential transaction object was created; number of times the potential transaction object was in each category previously; total number of days spent in each category; the amount associated with the potential transaction object; the total number of updates made to the amount in a given time interval or since the potential transaction object was created.

The recommendation engine 250 recommends certain potential transactions to the user via the client application 115. The recommended potential transactions represent potential transactions for which the users are advised to perform certain actions associated with the potential transaction. The action associated with a potential transaction may depend on the current stage of the potential transaction. For example, an associated with a potential transaction may require a user of the enterprise to contact a corresponding user of the third party associated with the potential transaction. As another example, an action associated with a potential transaction may represent adjustment of an amount associated with the potential transaction. In an embodiment, the recommendation engine 250 identifies potential transaction that are likely to have the highest impact on the revenue of the enterprise at the end of a given time interval, for example, at the end of the month.

Overall Process

The processes associated with object analysis performed by online system 100 are described herein. The steps described herein for each process can be performed in an order different from those described herein. Furthermore, the steps may be performed by different modules than those described herein.

Figure 3:
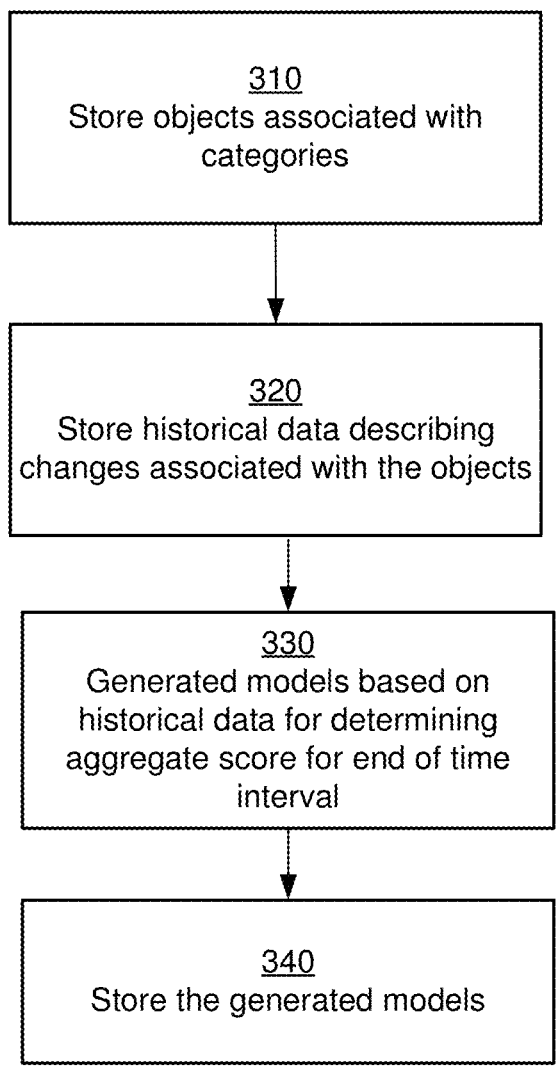
FIG. 3 illustrates a process for generating models for determining an aggregate score value for the end of time-interval, according to an embodiment.

FIG. 3 illustrates a process for generating models for determining an aggregate score value for the end of time-interval, according to an embodiment. The object store 155 stores various objects, for example, objects representing potential transactions. Each object is associated with a state. There are be a plurality of states that an object can take. Each object acts a state transition machine that changes states according to certain rules. For example, an object in a state S1 may transition to state S2 if there are certain changes in data associated with the object. For example, if the data associated with an object is updated to indicate that a contract associated with the potential transaction was executed, the state of the objects may change from S1 to S2.

The historical data store 160 stores changes in data associated with objects as well as state transitions of the objects. The historical data store 160 stores information indicating creation of new objects. For example, if a new potential transaction is identified, a new object is created in the object store 155. The historical data store 160 also stores aggregate score associated with past time intervals. For example, for the historical data store 160 may store the aggregate revenue generated as a result of potential transactions that reached a final state indicating the potential transaction was successful.

Figure 4:
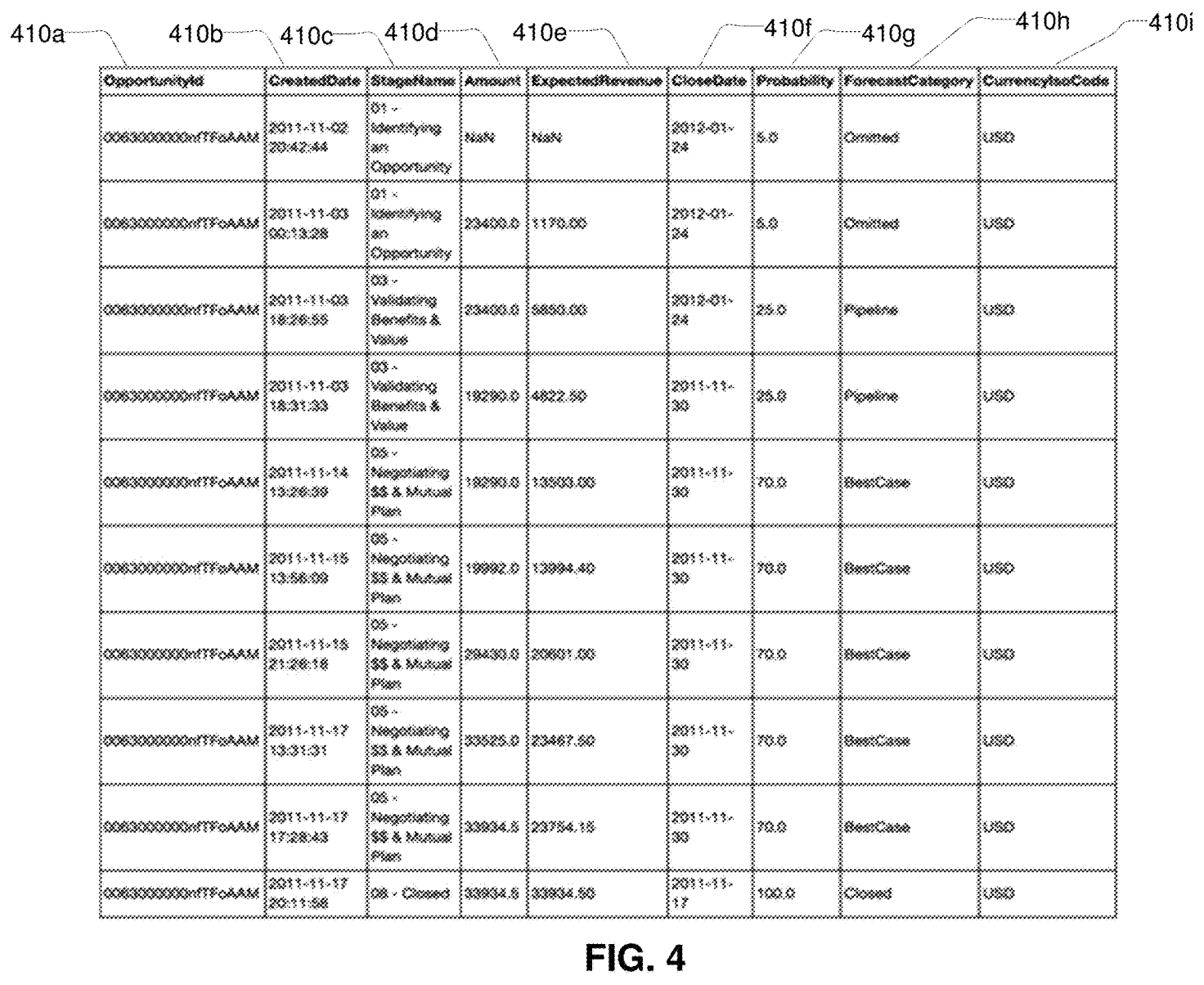

FIG. 4 shows an example of historical data associated with a potential transaction object stored in the online system, in accordance with an embodiment. A record stored in the historical data store 160 includes attributes describing an activity associated with the record. The attributes comprise, an identifier 410a for the potential transaction or opportunity corresponding to the activity represented by the record, the creation date 410b of the record indicating the date of the activity, a stage name 410c for the potential transaction, an amount 410d associated with the potential transaction (e.g., an amount representing a value of a product or service that is a subject of the potential transaction), an expected revenue 410e from the potential transaction, an expected close date 410f representing a date when the potential transaction is expected to close, a probability 410g representing a probability that the potential transaction will close as a successful transaction, a category 410h for the potential transaction, a currency code 410i for the potential transaction, and so on. Other attributes that may be stored in the historical data store 160 include a type of the potential transaction (for example, a type describing the engagement associated with the potential transaction, such as, a purchase, an upgrade, an upsell, and so on), a flag indicating whether the potential transaction is closed, a flag indicating whether the transaction is won or lost if the transaction is closed, and so on. Other embodiments may include more or fewer attributes in each record.

Figure 5:
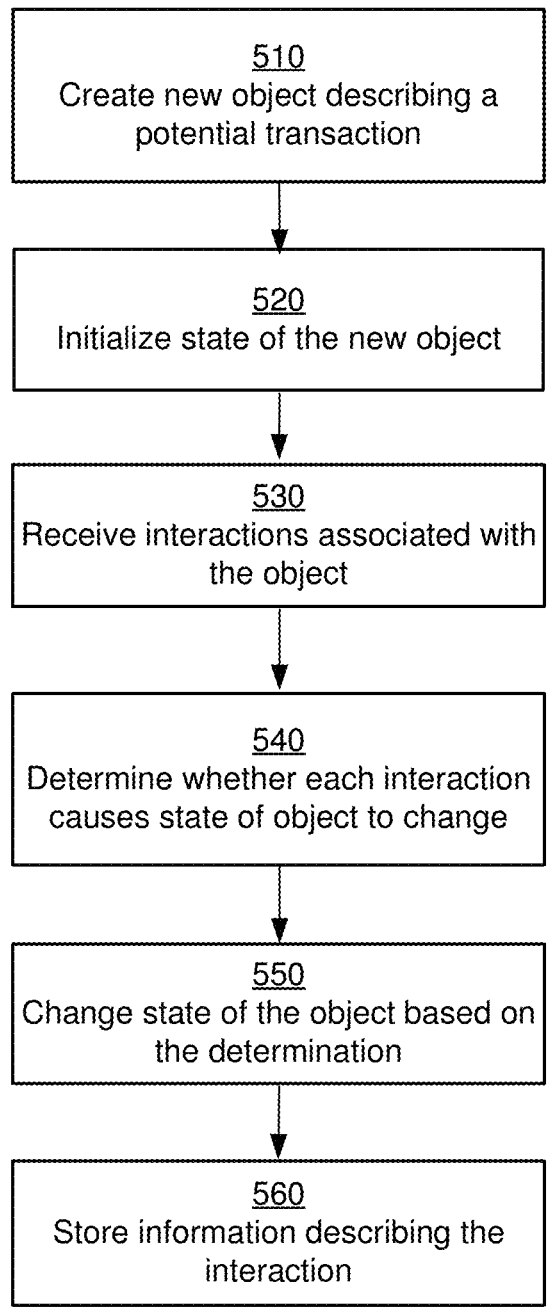
FIG. 5 shows the process of modifying the state of a potential transaction object, in accordance with an embodiment.

FIG. 5 shows the process of modifying the state of a potential transaction object, in accordance with an embodiment. The object manager 140 creates 510 a potential transaction object describing a potential transaction of an enterprise associated with the online system, for example, an enterprise representing a tenant of a multi-tenant system. In an embodiment, the object manager 140 creates 510 the new object in response to a request from a user associated with an online system, for example, a user responsible for performing user interactions associated with the potential transaction.

The object manager 140 initializes 520 the state of the potential transaction object created. The online system 100 may determine and store default value for the initial state of a potential transaction. For example, the online system may receive from a user of the online system, a default value of "initialized" as the initial state of the potential transaction object.

The online system 100 receives 530 information describing user interactions associated with the online system. In an embodiment, the user interaction manager 125 receives from the client application 115, an interaction associated with the potential transaction object and stores information describing the interaction in the object historical data store 160. For example, the client application 115 may allow a user of the online system 100 to interact with a user of a third party system 120 associated with the potential transaction via email or another online communication.

The object manager 140 determines 540 whether the interaction caused a change in state of the potential transaction object. The object manager 140 changes 550 the state of the potential transaction object based on the determination 540. For example, if the object manager 140 determines that no user interactions associated with the potential transactions were performed for more than a threshold amount of time, the object manager 140 changes the state of the potential transaction object to an "inactive" state. Similarly, if the object state manager 140 determines that an interaction associated with the potential transaction object having an "inactive" state was performed, the object manager 140 modifies the state of the potential transaction object to an "active" state. The object manager 140 stores information describing the interaction as a record in the object historical data store 160.

Predicting Based on Models Per Sub-Interval of a Time Interval

The model generator 200 builds the training data for building a predictor model, for example, a linear regression model for each of the past months. The model generator 200 identifies each potential transaction representing an open opportunity from the historical data store 160 such that the open opportunity was scheduled to close at the end of the month. The model generator 200 creates a data structure representing bins for categorizing objects. The model generator 200 creates a plurality of bins, each bin corresponding to one or more categories of the objects. For example, one bin may be created per category: omitted, pipeline, best case, forecast/commit, and closed. Alternatively the same bin may represent objects for two or more categories, for example, a bin may represent both categories pipeline and best case.

Figure 6:
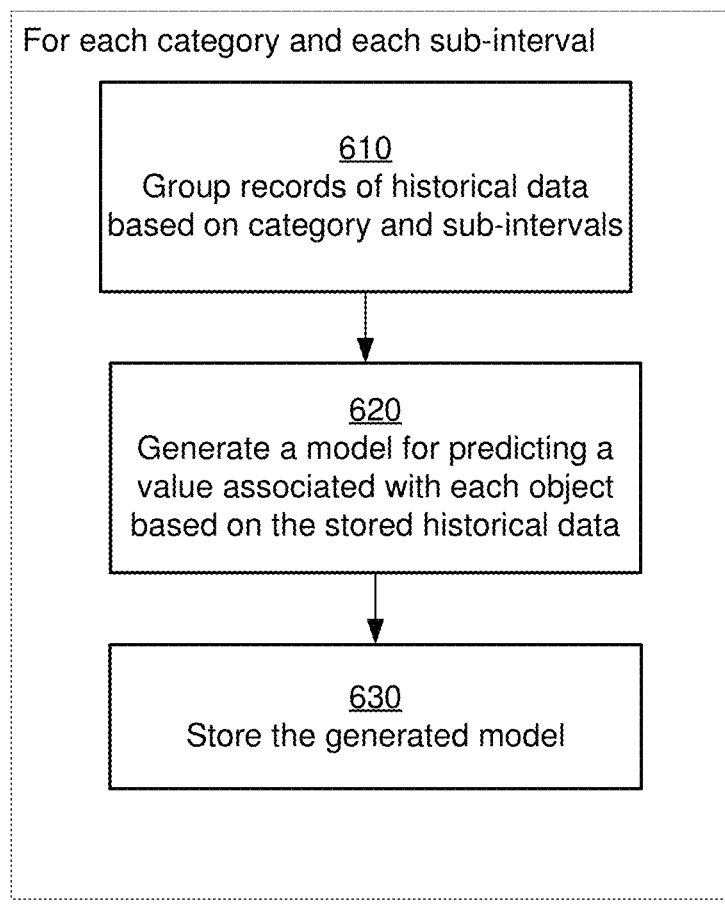
FIG. 6 shows the process of generating predictor models for determining an aggregate value associated with a set of objects, in accordance with an embodiment.

FIG. 6 shows the process of generating predictor models for determining an aggregate value associated with a set of objects, in accordance with an embodiment. The model generator 200 identifies a time interval corresponding to each record and a sub-interval within the time interval for that record. For example, the time interval may represent a month corresponding to the record and the sub-interval may represent a day corresponding to the record. The model generator 200 groups 610 records of historical data based on categories of the objects. In an embodiment, the model generator 200 categorizes each object according to the category of the potential transaction corresponding to the object. Furthermore, the model generator 200 groups the historical records based on a number of business left to reach the end of the month based on the current date of the opportunity.

The attribute representing a value of each object is summed for each bin. The attribute representing the value of the object may be the amount of each potential transaction associated with the object.

The model generator 200 generates a model for predicting a value of each object based on the stored historical data. In an embodiment, a model is a liner regression based model. The model may be a machine learning based model. The model generator 200 may generate a model for each category or a model that predicts a value for each category. The model generator 200 generates the models for each sub-interval representing business days away from the end of the time interval (i.e., the month). Since the linear regression is performed for each business day away from the end of the month, the model generator 200 generates a model for each business day away (for example, model(s) for predicting values for each category for when 20 business days are left before the end of the month, model(s) for predicting values for each category for when 19 business days are left before the end of the month, and so on). The model generator 200 stores 630 the generated models in the model store 230.

FIG. 7 illustrates the preparation of the historical data for generating models, according to an embodiment. FIG. 7 shows how the data is prepared for a past month based on the days left before the end of the month. The data is similarly prepared for other past months. Once the data is prepared, linear regression can be applied on a per days left basis in order to have a model(s) for every sub-interval of the time-interval, for example, every day left in the month.

Figure 8:
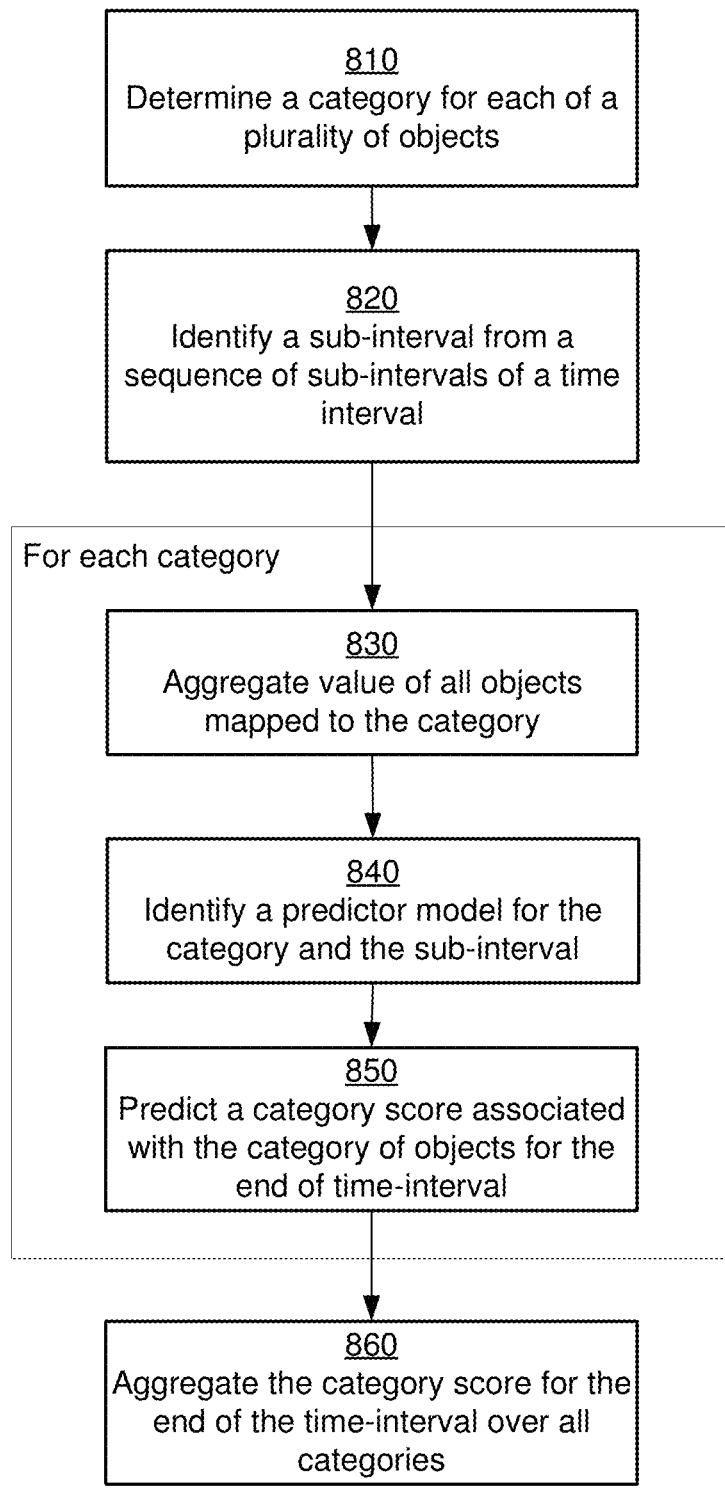
FIG. 8 shows the process of determining an aggregate value associated with a set of objects using predictor models illustrated in FIG. 6, in accordance with an embodiment.

FIG. 8 shows the process of determining an aggregate value associated with a set of objects using predictor models illustrated in FIG. 6, in accordance with an embodiment. The object analyzer 130 analyzes the objects to determine an aggregate value associated with the objects at the end of a time-interval, for example, to predict a total value of end-of-month sales. The object analyzer 130 determines 810 a category for each of a plurality of objects. The category may depend on the current state of each object. The object analyzer 130 determines a time interval, for example, the current month and identifies 820 a sub-interval from a sequence of sub-intervals of the time interval. For example, the sequence of sub-intervals may represent a sequence of days of the month in a chronological order. The object analyzer 130 may perform the analysis for specific sub-interval, for example, a specific day of the month.

The object analyzer 130 performs the following steps 830, 840, and 850 for each category. The object analyzer 130 aggregates 830 the value of all objects mapped to that category. The model execution engine 220 identifies 840 a predictor model for the category and the identified sub-interval. The model execution engine 220 executes the identified predictor model to predict a category score associated with the category of objects for the end of time-interval. For example, the category score may represent the expected total value (e.g., revenue) of all objects belonging to that category at the end of the month. Accordingly, the object analyzer 130 determines a category score value for each category for the end of the time interval.

The object analyzer 130 aggregates 860 the category score for the end or time-interval over all categories to obtain the overall aggregate score (or aggregate value) associated with the time interval. For example, the aggregate score may represent the total expected month-end revenue based on the objects determined for that particular day. As data associated with events is received every day, the object analyzer 130 may recalculate the total expected month-end revenue every day.

To summarize, the object analyzer 130 applies the linear regression models to objects representing currently available potential transactions (or opportunities) to predict the month-end sales/revenue amount. Each day, the object analyzer 130 identifies each open opportunity that is scheduled to close at the end of the month. The identified opportunities are binned as described above based on their respective category. The opportunities of each bin are summed. The system determines the number of business days left before the end of the month and identifies the coefficients determined for that number of business days left. The predicted end of the time-interval aggregate score is determined using the following equation:

$$y = \beta_{Pipeline} X_{Pipeline} + \beta_{BestCase} X_{BestCase} + \beta_{Forecast} X_{Forecast} + \beta_{Closed} X_{Closed} + \beta_{Omitted} X_{Omitted}$$

where y is the predicted end of the time-interval aggregate score (e.g., end of the month sales amount); $\beta_{Pipeline}$ is the pipeline coefficient; $X_{pipeline}$ is the sum of the opportunities in the pipeline bin; $\beta_{BestCase}$ is the best case coefficient; $X_{BestCase}$ is the sum of the opportunities in the best case bin; $\beta_{Forecast}$ is the forecast coefficient; $X_{Forecast}$ is the sum of the opportunities in the forecast bin; $\beta_{Closed}$ is the closed coefficient; $X_{Closed}$ is the sum of the opportunities in the closed bin; $\beta_{Omitted}$ is the omitted coefficient; and $X_{Omitted}$ is the sum of the opportunities in the omitted bin.

Examples described here are based on models generated for a month long time interval, for example, a month long sales cycle, and use a day long sub-interval to output a new prediction daily. However, in other embodiments the models can be generated for different periods. For example, the models can be built for quarter long time intervals and use week log sub-intervals to allow predictions to be updated weekly.

In an embodiment, the online sytem 100 uses Principal Component Analysis (PCA) to create fewer bins instead of creating as many bins as the possible states of the objects. This allows the online sytem 100 to effectively transform the data, allowing for a more robust regression. The online sytem 100 applying PCA to identify trends in the data. This allows the online system 100 to perform grouping of certain categories. For example, the online sytem 100 may determine that the forecast and closed categories have more than a threshold measure of correlation and they increase together, and the pipeline and best case categories also have more than a threshold measure of correlation and they decrease together. Accordingly, the online system 100 bins the pipeline and best case opportunities together and bins the forecast and closed opportunities together. As a result, instead of applying linear regression to five variables, the online system 100 applies linear regression to two variables (pipeline+best case and forecast+closed) with the target still being the month end sales/revenue amount.

FIG. 9 illustrates object data showing two supplementary columns added based on PCA, according to an embodiment of the invention. As shown in FIG. 9, column 910a is PipelineBestCase (pipeline+best case categories) and column 910b is CommitClosed (commit+closed).

Models Based on Potential Transactions Not Yet Created

In one embodiment, the object analyzer 130 determines an estimate of a value of objects representing potential transactions are binned using a machine learned probability for existing potential transactions and potential transactions that are not yet in the pipeline. The object analyzer 130 determines the expected value of an object by multiplying the potential transaction's amount by a machine learned probability that the potential transaction will close by the end of the month. The object analyzer 130 determines the probability using a machine learning based predictor model that is trained using historical opportunity data. In one embodiment, the machine learning based model is a random forest model.

Figure 10:
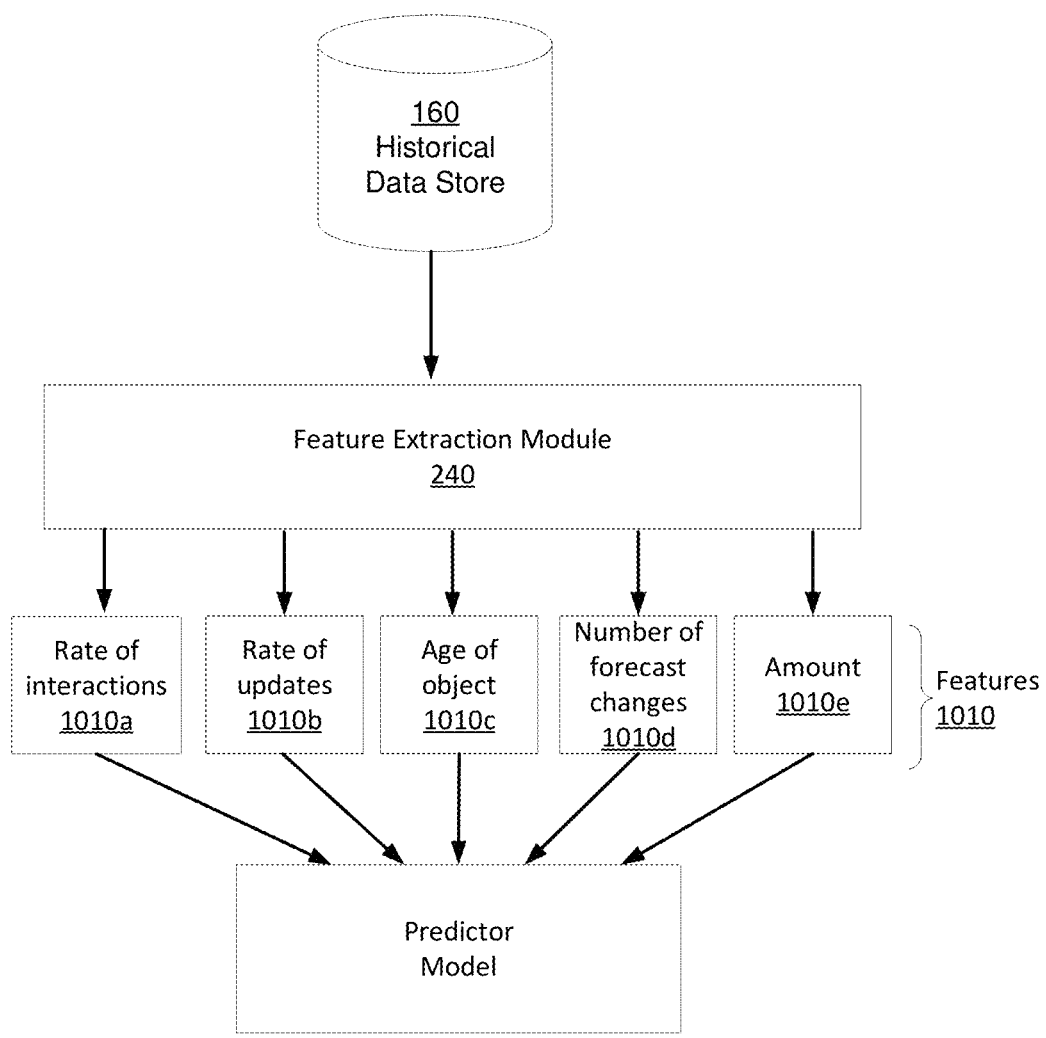
FIG. 10 shows the process of training a machine learning based predictor model for predicting a value associated with objects representing potential transactions that are not yet in pipeline, in accordance with an embodiment.

FIG. 10 shows the process of training a machine learning based predictor model for predicting a value associated with objects representing potential transactions that are not created and are therefore not yet in pipeline, in accordance with an embodiment. As shown in FIG. 10, the feature extraction module 240 retrieves records representing historical data describing various activities associated with potential transaction objects from the historical data store 160. The feature extraction module 240 extracts various features from the records retrieved from the object historical data store 160. Examples of features 1010 illustrated in FIG. 10 include a feature 1010a representing a rate of user interactions associated with a potential transaction object, a feature 1010b representing a rate of updates to a potential transaction object, a feature 1010c representing an age of a potential transaction object, a feature 1010d representing a number of category changes to a potential transaction object, a feature 1010e representing an amount associated with a potential transaction object, and so on. The machine learning module 210 uses the extracted features to train the predictor model.

Figure 11:
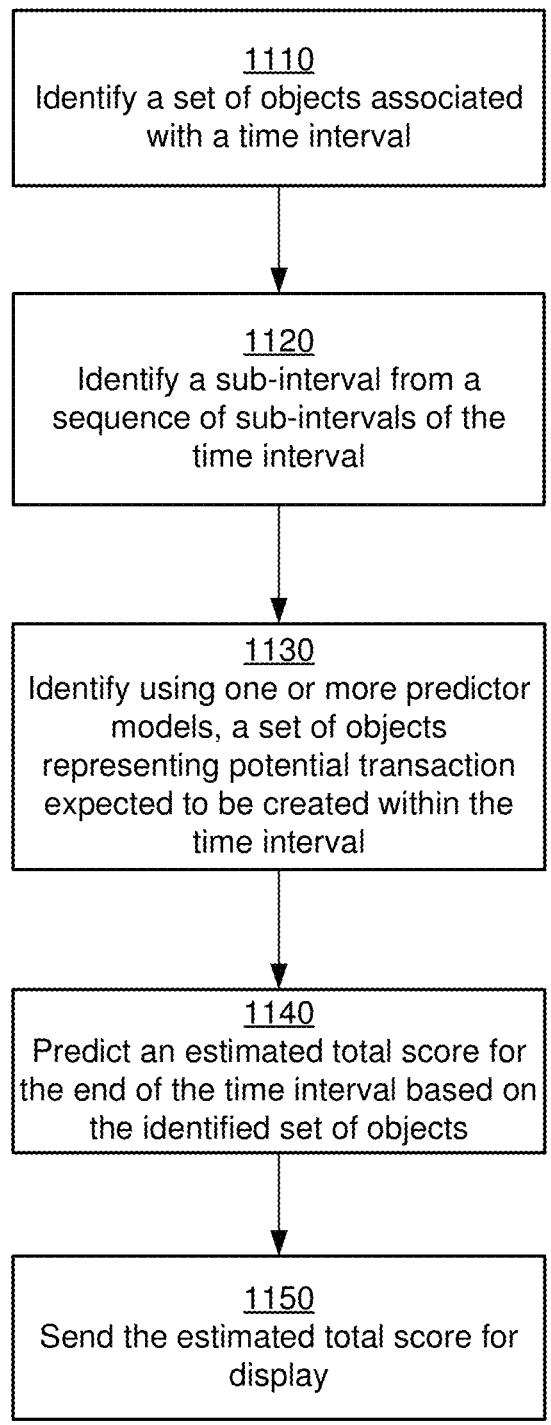
FIG. 11 shows the process of determining an aggregate value associated with the end of time-interval based on potential transactions not yet created, according to an embodiment of the invention.

FIG. 11 shows the process of determining an aggregate value associated with the end of time-interval based on potential transactions not yet created, according to an embodiment of the invention. The object analyzer 130 identifies a time interval and identifies 1010 a set of objects associated with the time interval, the set of objects representing potential transactions that are currently open. The time interval comprises a sequence of sub-intervals, for example, a time interval representing a month comprises a sequence of days, each day representing a sub-interval. The object analyzer 130 identifies 1120 a current sub-interval from the sequence of sub-intervals, for example, a current sub-interval representing a day for which the analysis is being performed. The object analyzer 130 uses one or more predictor models to identify 1130 a set of objects representing potential transaction not yet created but expected to be created within the time interval. The object analyzer 130 predicts 1140 an estimated total score for the end of the time interval based on the identified set of objects. The object analyzer 130 sends the estimated total score to a client device, for example, to a client device for display in a report. In an embodiment, the online system provides recommendations for actions that a user may take based on the estimated total score. For example, the online system may provide a list of objects for which actions may be taken to improve the aggregate score/value at the end of time-interval.

In one embodiment, the object analyzer 130 estimates the aggregate value associated with the end of time interval, for example, the total month end sales numbers (Amount_expected_InMonth) by summing the expected values for the currently available potential transactions representing open opportunities.

$$\text{Amount\_expected\_InMonth} = \Sigma_{In\ Month}\ (p * \text{Amount})$$

where p is the machine learned probability that a particular opportunity will close by the end of the month and Amount is the amount of that particular opportunity.

In an embodiment, the object analyzer 130 improves the quality of the end of the time interval prediction using a boosted regression model. For example, the object analyzer 130 determines a residual value Amount_notExpected_EOM defined as follows:

$$\text{Amount\_notExpected\_EOM} = \text{Amount\_final\_EOM} - \text{Amount\_expected\_InMonth} - \text{Amount\_projected\_Closed}$$

where Amount_final_EOM is the actual aggregate value (e.g., total sales amount at the end of the month) and Amount_projected_Closed is the aggregate value (e.g., amount of sales) for potential transactions that have already closed this month. Accordingly, the online system determines the residual (Amount_notExpected_EOM) representing the aggregate value (e.g., amount of sales) that are not yet in the pipeline but expected to close this month. The residual is estimated using linear regression models. The variables in this prediction can be binned values of various types as described according to various embodiments below.

Accordingly, the online system groups objects into bins associated with categories using a process similar to the process described in FIG. 6. In one embodiment, the potential transaction represents a sales opportunity but can be any other potential transaction, not limited to sales opportunities. The online system 100 identifies a plurality of potential transactions expected to close at the end of a time period. The online system assigns each of the plurality of sales opportunities to one of a plurality of categories based on a state of the object, for example, a state indicating how far along the sales opportunity is in a sales process. The online system determines, for each of the plurality of categories, a sum of amounts associated with sales opportunities assigned to the category. The online system determines an estimated total sales amount for sales opportunities that have not yet been created based on a linear regression model and the sum of each of the plurality of categories. The online system determines an estimated total sales amount for the end of the time period based on the estimated total sales amount for sales opportunities that have not yet been created.

In an embodiment, the online system groups objects representing potential transactions are into bins based on their respective category and determines a category score by adding the values associated with objects in each category. For example, a category score Amount_Omitted is determined for category omitted, a category score Amount_Pipeline, is determined for category pipeline, a category score Amount_Forecast is determined for category forecast, a category score Amount_Commit is determined for category commit, and a category score Amount_Closed is determined for category closed. Linear regression is applied similar to the process described in FIG. 6 except that each predictor model determines a value of the residual for the end or time interval representing a value associated with all potential transactions that are not yet created but are expected to be created and expected to close within the time interval.

In another embodiment, the online system groups objects representing potential transactions into bins corresponding to categories of the objects, and for each bin, determines a sum of the expected value of the potential transactions. For example, a category score Amount_expected_Omitted is determined based on the expected value of objects in the category omitted, a category score Amount_expected_Pipeline is determined based on the expected value of objects in the category pipeline, a category score Amount_expected_Forecast is determined based on the expected value of objects in the category forecast, and so on. The online system uses a machine learning based predictor model trained to predict the estimated value of potential transactions that have not yet been created. For example, the online system 100 determines an estimated total sales amount for sales opportunities that have not yet been created based on a linear regression model and expected values of the plurality of sales opportunities. The online system 100 determines an estimated aggregate value (e.g., total sales amount) for the end of the time period based on the estimated total sales amount for sales opportunities that have not yet been created.

In another embodiment, online system uses a single variable to represent value of the objects instead of a plurality of variables corresponding to each category. The online system use a variable Amount_expected_InMonth representing the total expected value for opportunities scheduled to close in the time interval (e.g., this month). Accordingly, in this embodiment, the online system does not categorize the objects into bins. The online system identifies all opportunities that are scheduled to close this month and sums the expected value of the identified opportunities.

In another embodiment, the online system uses two variables as input to the predictor model, one variable is Amount_expected_InMonth (similar to that used in the previous embodiment) and the other variable Amount_expected_out is the total expected value for opportunities scheduled to close after this month.

The online system predicts the residual (Amount_notExpected_EOM) and determines the end of the month sales prediction (Amount_final_EOM$_{pred}$) as follows:

$$\text{Amount\_final\_EOM}_{pred} = \text{Amount\_expected\_InMonth} + \text{Amount\_projected\_Closed} + \text{Amount\_notExpected\_EOM}$$

The online system determines Amount_expected_InMonth as described above. The online system also determines Amount_projected_Closed since those opportunities have already closed.

The boosted model of this embodiment analyzes in-month and out-of-month opportunities using the following format:

$$\text{Amount\_notExpected\_EOM} = a * \text{Amount\_expected\_out} + b * \text{Amount\_expected\_InMonth}$$

where "a" is the coefficient for Amount_expected_out and "b" is the coefficient for Amount_expected_InMonth.

The online system determines the final prediction of the aggregate value associated with the end of time interval using following equation:

$$\text{Amount\_final\_EOM}_{pred} = \text{Amount\_expected\_InMonth} + \text{Amount\_projected\_Closed} + \text{Amount\_notExpected\_EOM} = \text{Amount\_expected\_InMonth} + \text{Amount\_projected\_Closed} + a * \text{Amount\_expected\_out} + b * \text{Amount\_expected\_InMonth}.$$

Figure 12:
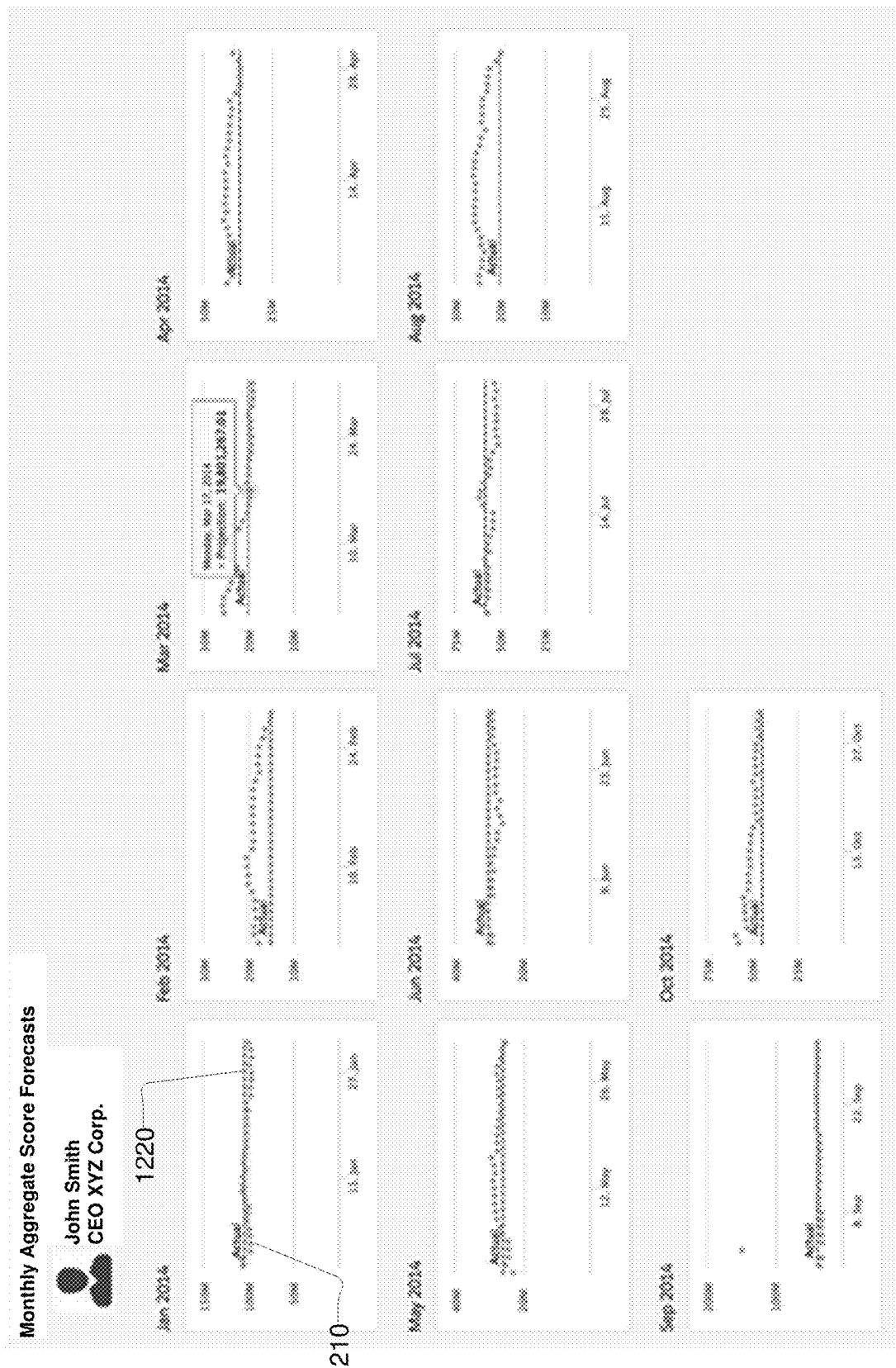
FIG. 12 shows a screenshot of a user interface presented to users based on predicted aggregate values for the end of time interval, for example, end of month sales numbers, according to an embodiment.

FIG. 12 shows a screenshot of a user interface presented to users based on predicted aggregate values for the end of time interval, for example, end of month sales numbers, according to an embodiment. FIG. 12 shows for each month, the forecasts 1210 of the aggregate score for each month that is calculated daily and the actual value 1220 of the aggregate score that was determined at the end of the month. These charts may be provided as a dashboard for a user, for example, a system administrator or an executive level user of an enterprise that is a tenant of a multi-tenant system.

Alternative Embodiments

In an embodiment, the online system is a multi-tenant system and the feature object analyzer 130 determines a set of feature weights that optimizes the aggregate accessed results ranks for each tenant separately. Accordingly, a first set of feature weights is determined that predicts potential transaction object state information for a first tenant, a second set of feature weights is determined that potential transaction object state information for a second tenant, and so on. For example, the first set of feature weights may be for a tenant representing a first customer of the multi-tenant system, and the second set of feature weights may be for tenant representing a second customer of the multi-tenant system.

The techniques disclosed herein can be applied to various problems. For example, the techniques can be used to predict when a computing system, for example, a likelihood of the performance of a server falling below a threshold level at the end of a time interval. The object analyzer 130 stores objects representing various processes/components executing within the server. Each object is associated with a state. An object may transition from one state to another responsive to various events taking place in the server. In an embodiment, the state of a process is based on the amount of work load or response time of the process. In another embodiment, the category of an object is based on the resources associated with the process, for example, processes that are CPU intensive are associated with one category, whereas processes that are storage intensive are grouped in another category. The techniques disclosed herein are used to determine based on the states of the processes, whether the overall performance of the server will be below a threshold by the end of a time interval, for example, by the end of the day or by the end of the hour. In another embodiment, the techniques disclosed herein are used to determine whether the server will crash by the end of a time interval. Accordingly, the system categorizes the objects into various categories based on the states of the objects and the predictor models determines a category score indicative of a likelihood of the server crashing (or having a performance below a threshold value based on the objects belonging to that category). The system aggregates the category scores to determine an aggregate score indicating the likelihood of the server crashing. In another embodiment, the system determines a likelihood that new processes/tasks will be created within the server or components activated within the server before the end of the time interval and determines the state of the system at the end of the time interval based on the estimated states of the new processes/ tasks will be created within the server or components activated within the server.

In another embodiment, the techniques disclosed herein are used for determining whether the performance of a machine comprising various components including electrical and mechanical components would be below a threshold value (or whether the machine would require attention from service personnel). The system stores various objects representing the various components. The state of each object is based on measurements received corresponding to each components. The system determines a state of the machine at the end of a time interval based on the states of the objects. As an example, the techniques are used to determine whether the machine, for example, a vehicle will require a particular service at the end of a time interval, for example, at the end of a year or a month.

Techniques for predicting state of an object representing a potential transaction using machine learning based models is described in the U.S. patent application Ser. No. 15/280, 126, titled "MACHINE LEARNING MODEL FOR PREDICTING STATE OF AN OBJECT REPRESENTING A POTENTIAL TRANSACTION" and filed on Sep. 29, 2016, which is hereby incorporated by reference in its entirety.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method comprising:
    for a tenant of a multi-tenant online system, storing, a plurality of objects, wherein an object represents a potential transaction and is associated with a value of the potential transaction, the object having one of a plurality of object categories, the object configured to perform category transitions responsive to changes in data associated with the object;
    extracting features of a set of objects that were previously processed and interacted with by one or more users, the features including:
        a number of changes to a category of an object of the set since the object was created,
        a rate of category changes applied to an object of the set, and
        an age of an object of the set, wherein the age of the object indicates a time period since the object was created;
    training a plurality of linear regression models for a set of object categories, a sequence of sub-intervals in a time interval, and the tenant of the multi-tenant online system based on the extracted features, each of the plurality of linear regression models associated with one of the object categories in the set of categories, one of the sub-intervals in the sequence, and the tenant of the multi-tenant online system, wherein training each of the plurality of linear regression models comprises using a training dataset including extracted features associated with one of the object categories in the set of categories, one of the sub-intervals in the sequence, and the tenant of the multi-tenant online system;
    identifying a set of objects from the plurality of objects, the identified set of objects representing potential transactions that are expected to close before the end of the time interval;
    selecting, a subset of trained linear regression models from the plurality of trained linear regression models, the subset including trained linear regression models for the tenant, for one or more object categories, and for a position of a current sub-interval in the time interval;
    executing the trained linear regression models from the subset to determine total expected values of the identified set of objects for the one or more object categories;
    determining a total score for an end of the time interval by aggregating the expected values across the plurality of object categories based on the identified set of objects; and
    sending the total score for display by a user interface.

2. The method of claim 1, wherein an object that was previously processed is stored in a historical data store as a database table, wherein each row of the database table represents a change in the value of the object.

3. The method of claim 1, wherein each object is represented as a database record.

4. The method of claim 1, wherein the time interval represents a month and each sub-interval represents a day of the month.

5. A non-transitory computer readable storage medium storing instructions for:
    for a tenant of a multi-tenant online system, storing, a plurality of objects, wherein an object represents a potential transaction and is associated with a value of the potential transaction, the object having one of a plurality of object categories, the object configured to perform category transitions responsive to changes in data associated with the object;
    extracting features of a set of objects that were previously processed and interacted with by one or more users, the features including:
        a number of changes to a category of an object of the set since creation of the object,
        a rate of category changes updates applied to an object of the set, and
        an age of an object of the set, wherein the age of the object indicates a time period since the object was created;
    training a plurality of linear regression models for a set of object categories, a sequence of sub-intervals in a time interval, and the tenant of the multi-tenant online system based on the extracted features, each of the plurality of linear regression models associated with one of the object categories in the set of categories, one of the sub-intervals in the sequence, and the tenant of the multi-tenant online system, wherein training each of the plurality of linear regression models comprises using a training dataset including extracted features associated with one of the object categories in the set of categories, one of the sub-intervals in the sequence, and the tenant of the multi-tenant online system;
    identifying a set of objects from the plurality of objects, the identified set of objects representing potential transactions that are expected to close before the end of the time interval;
    selecting, a subset of trained linear regression models from the plurality of trained linear regression models, the subset including trained linear regression models for the tenant, for one or more object categories, and for a position of a current sub-interval in the time interval;

executing the trained linear regression models from the subset to determine total expected values of the identified set of objects for the one or more object categories;

determining a total score for an end of the time interval by aggregating the expected values across the plurality of object categories based on the identified set of objects; and sending the total score for display by a user interface.

6. The non-transitory computer readable storage medium of claim 5, wherein an object that was previously processed is stored in a historical data store as database table, wherein each row of the database table represents a change in the value of the object.

7. A computer-implemented system of a multi-tenant online system, the system comprising:

a computer processor; and a computer readable non-transitory storage medium storing instructions thereon, the instructions when executed by a processor cause the processor to perform steps comprising:

for a tenant of a multi-tenant online system, storing, a plurality of objects, wherein an object represents a potential transaction and is associated with a value of the potential transaction, the object having one of a plurality of object categories, the object configured to perform category transitions responsive to changes in data associated with the object;

extracting features of a set of objects that were previously processed and interacted with by one or more users, the features including:

a number of changes to a category of an object of the set since creation of the object, a rate of category changes applied to an object of the set, and an age of an object of the set, wherein the age of the object indicates a time period since the object was created;

training a plurality of linear regression models for a set of object categories, a sequence of sub-intervals in a time interval, and the tenant of the multi-tenant online system based on the extracted features, each of the plurality of linear regression models associated with one of the object categories in the set of categories, one of the sub-intervals in the sequence, and the tenant of the multi-tenant online system, wherein training each of the plurality of linear regression models comprises using a training dataset including extracted features associated with one of the object categories in the set of categories, one of the sub-intervals in the sequence, and the tenant of the multi-tenant online system;

identifying a set of objects from the plurality of objects, the identified set of objects representing potential transactions that are expected to close before the end of the time interval;

selecting, a subset of trained linear regression models from the plurality of trained linear regression models, the subset including trained linear regression models for the tenant, for one or more object categories, and for a position of a current sub-interval in the time interval;

executing the trained linear regression models from the subset to determine total expected values of the identified set of objects for the one or more object categories;

determining a total score for an end of the time interval by aggregating the expected values across the plurality of object categories based on the identified set of objects; and sending the total score for display by a user interface.

8. The method of claim 1, wherein the features further comprise a total number of updates to an object of the set since the object was created.

9. The method of claim 1, wherein the features further comprise a number of days since a last update to the object.

10. The method of claim 1, wherein the features further comprise a number of days spent in each object category.

* * * * *

UNITED STATES PATENT AND TRADEMARK OFFICE
CERTIFICATE OF CORRECTION

PATENT NO. : 11,651,237 B2
APPLICATION NO. : 15/721346
DATED : May 16, 2023
INVENTOR(S) : Rickard, Jr. et al.

Page 1 of 1

It is certified that error appears in the above-identified patent and that said Letters Patent is hereby corrected as shown below:

In the Claims

In Column 20, in Claim 5, Line 44, after "changes" delete "updates".

Signed and Sealed this
Eighth Day of August, 2023

Katherine Kelly Vidal
*Director of the United States Patent and Trademark Office*